US012113841B2

(12) United States Patent
Suryavanshi et al.

(10) Patent No.: US 12,113,841 B2
(45) Date of Patent: Oct. 8, 2024

(54) LINEAR MEDIA CHANNEL QUALITY OF EXPERIENCE EVALUATION SYSTEMS AND METHODS

(71) Applicant: VIASAT, INC., Carlsbad, CA (US)

(72) Inventors: Vijay A. Suryavanshi, San Diego, CA (US); Carl R. Erhard, Reminderville, OH (US); Joshua G. Slater, Rancho Mission Viejo, CA (US); Stuart H. Floyd, Hopkinton, MA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/110,745

(22) Filed: Feb. 16, 2023

(65) Prior Publication Data

US 2023/0275943 A1 Aug. 31, 2023

Related U.S. Application Data

(63) Continuation of application No. PCT/US2020/047049, filed on Aug. 19, 2020.

(51) Int. Cl.
  *G06F 15/16* (2006.01)
  *H04L 65/611* (2022.01)
(52) U.S. Cl.
  CPC ................. *H04L 65/611* (2022.05)
(58) Field of Classification Search
  CPC ... H04L 65/611; H04L 65/80; H04L 65/4076; H04L 65/4084; H04L 67/12; H04L 43/08
  USPC ........................................................ 709/217
  See application file for complete search history.

(56) References Cited

U.S. PATENT DOCUMENTS 9,560,159 B1 *   1/2017  Lewis ................... H04L 67/306
10,015,528 B2 *  7/2018  Kunisetty ........ H04N 21/23109
10,171,529 B2 *  1/2019  Ricci ....................... H04L 65/61
10,394,408 B1 *  8/2019  Freund ................... H04N 21/00
(Continued)

OTHER PUBLICATIONS

International Search Report and Written Opinion issued in international application No. PCT/2020/047049 on Jul. 5, 2021 in 13 pages.

*Primary Examiner* — Alicia Baturay
(74) *Attorney, Agent, or Firm* — Chang & Hale LLP

(57) ABSTRACT

A communication system comprises an onboard server situated onboard a mobile platform and a remote server situated outside the mobile platform. The remote server is configured to generate one or more linear media channels for use by the onboard server. The communication system further comprises a virtual media client situated onboard the mobile platform. The virtual media client is configured to receive linear media channels from the onboard server and transmit performance data to the onboard server. The onboard server is configured to receive one or more media requests from a plurality of user media clients onboard the mobile platform. The one or more media requests specify one or more linear media channels. The onboard server is further configured to receive the one or more linear media channels from the remote server, provide the one or more linear media channels to the plurality of user media clients according to the received one or more media requests, provide at least a first linear media channel of the one or more media channels to the virtual media client; and receive a first set of performance data associated with the first linear media channel from the virtual media client.

39 Claims, 4 Drawing Sheets

(56) References Cited

U.S. PATENT DOCUMENTS

| | | | |
|---|---|---|---|
| 10,880,616 B2* | 12/2020 | Tirella | ............... H04B 7/18513 |
| 2015/0341541 A1* | 11/2015 | Naik | .................... H04N 23/661 |
| | | | 455/556.1 |
| 2020/0107081 A1 | 4/2020 | Tirella et al. | |

* cited by examiner

LINEAR MEDIA CHANNEL QUALITY OF EXPERIENCE EVALUATION SYSTEMS AND METHODS

RELATED APPLICATION(S)

This application is a continuation of International Patent Application No. PCT/US2020/047049, filed Aug. 19, 2020, entitled LINEAR MEDIA CHANNEL QUALITY OF EXPERIENCE EVALUATION SYSTEMS AND METHODS, the disclosure of which is hereby incorporated by reference in its entirety.

BACKGROUND

The present disclosure relates to linear media channel quality of experience evaluation, and more particularly to systems and methods of linear media channel quality of experience evaluation for mobile platforms including aircrafts.

SUMMARY

Described herein are systems, devices, and methods for monitoring data and/or managing transmission of data at mobile platforms including vehicles.

In one embodiment, a communication system is described that comprises an onboard server situated onboard a mobile platform and a remote server situated outside the mobile platform. The remote server is configured to generate one or more linear media channels for use by the onboard server. The communication system further comprises a virtual media client situated onboard the mobile platform. The virtual media client is configured to receive linear media channels from the onboard server and transmit performance data to the onboard server. The onboard server is configured to receive one or more media requests from a plurality of user media clients onboard the mobile platform. The one or more media requests specify one or more linear media channels. The onboard server is further configured to receive the one or more linear media channels from the remote server, provide the one or more linear media channels to the plurality of user media clients according to the received one or more media requests, provide at least a first linear media channel of the one or more media channels to the virtual media client; and receive a first set of performance data associated with the first linear media channel from the virtual media client.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
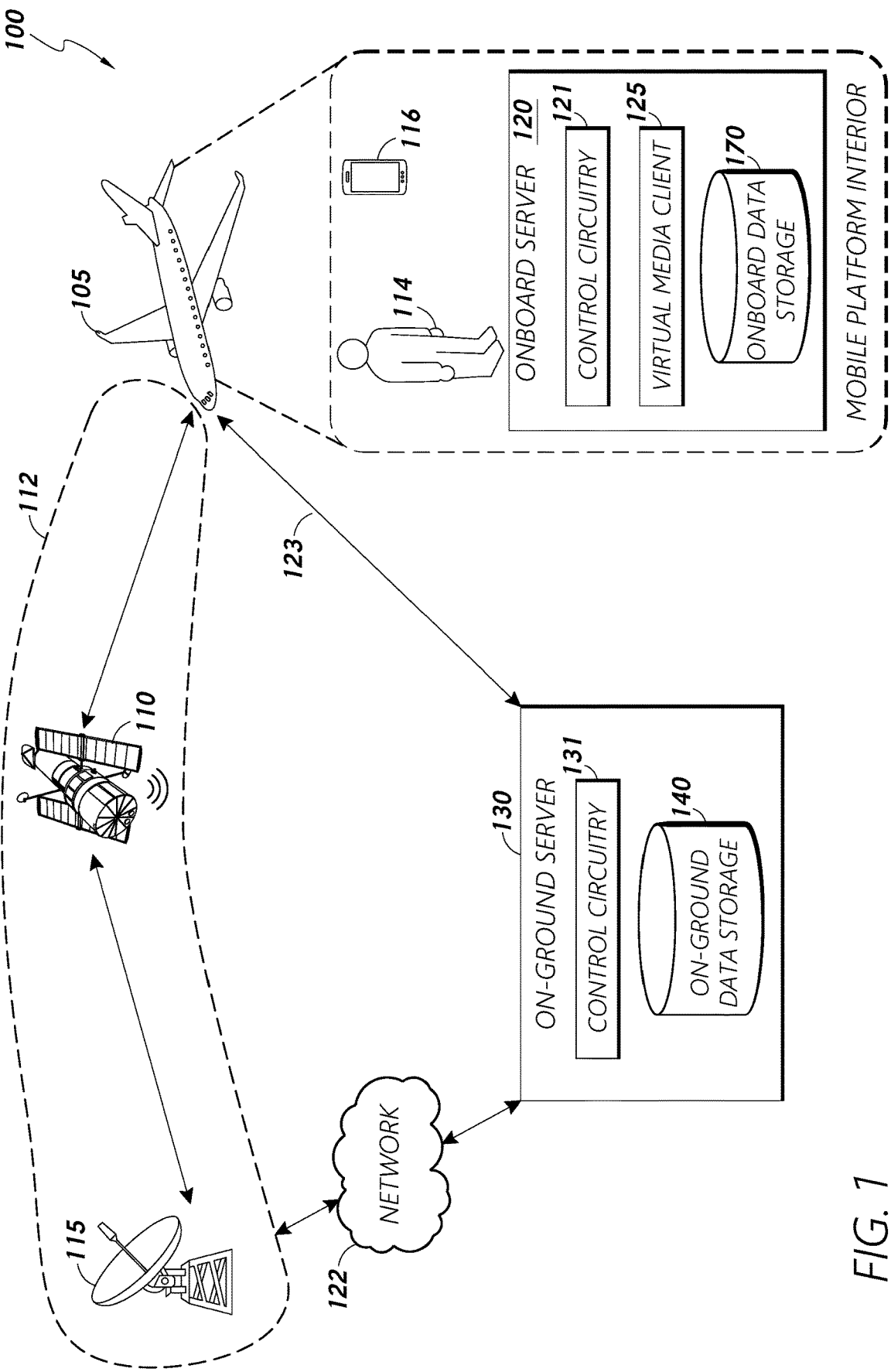
FIG. 1 illustrates a system for managing transmission of data between a mobile platform, such as a vehicle, and/or a server onboard the mobile platform and an on-ground server, in accordance with one or more embodiments.

The headings provided herein are for convenience only and do not necessarily affect the scope or meaning of the claimed invention. In certain implementations, the present disclosure relates to systems, devices and methods for managing and/or transferring system log data related to a passenger service (e.g., provided onboard a mobile platform) to and/or from onboard monitoring systems of mobile platforms.

Overview

The present disclosure provides devices, systems, and processes for evaluation of quality of experience data for communication systems configured to provide linear media channels and/or other media data to media clients onboard mobile platforms (e.g., vehicles). "Quality of experience" data may refer to any data representing measurements of communication service performance with respect to user quality of experience of one or more linear media channels and can include, for example, startup data and/or rebuffer data. Startup data may include any data indicative of an amount of time required to begin streaming of media data at a media client. Rebuffer data may include any data indicative of a number of rebuffer events (rebuffer count) at a media client during streaming of media data and/or indicative of a total time of the rebuffer events (rebuffering duration). Rebuffer events may include interruptions of streaming of media data for performance of buffering operations and may occur as needed at any point during streaming of the media data. In some cases, rebuffer events may be caused by failed and/or slow transmission of media data between devices.

"Linear media channels" may refer to any real-time broadcasts of video and/or audio content and may include, for example, live television content. Linear media channels may include scheduled streams of content. In response to a user selecting a linear media channel, the user (i.e., the user's media client) may be caused to join the linear media channel and view a stream of content currently provided by the linear media channel. For example, the stream of content may be simultaneously streamed to the user's media client and any other media clients that are joined to the linear media channel. Thus, joining the linear media channel may not cause the user's media client to begin streaming media content from a default starting point (e.g., the beginning of a movie) but may instead begin streaming at a point currently streamed to other devices.

In some embodiments, linear media channels may be broadcast from remote (e.g., on-ground) computing devices (e.g., servers) to computing devices (e.g., servers) onboard mobile platforms. Computing systems onboard mobile platforms may be further configured to receive various data transmissions from remote servers while remote servers may be configured to receive various data transmissions from computing systems onboard mobile platforms. Received data may be collected, aggregated, filtered, analyzed and/or otherwise processed onboard mobile platforms and/or at on-ground computing systems.

Linear media channels and/or other media content may be configured for streaming at various media clients. A "media client," as used herein, may refer to any device configured to transmit and/or receive media data, access and/or play various media content, and/or transmit performance metrics (including quality of experience performance data) and may include, for example: personal electronic devices (PEDs) such as smartphones, laptop computers, and tablets; crew member devices; entertainment systems (e.g., seatback entertainment systems in the case of aircrafts); and/or virtual media clients. The term "virtual media client," as used herein, may refer to a dedicated media client configured specifically for use in streaming of media content and/or transmission of quality of experience data onboard mobile platforms. Virtual media clients may be configured to connect to computing systems onboard mobile platforms (e.g., onboard servers) via wired and/or wireless connections. The term "user media client," as used herein, may refer to any media client (e.g., a PED) that is not a virtual media client. In some embodiments, virtual media clients may be configured for running and/or emulating multiple operating systems, software applications, and/or media systems.

In some embodiments, virtual media clients may be situated onboard a vehicle during a trip of the vehicle. In this way, a virtual media client may provide an accurate and/or representative example of streaming quality as experienced by user media clients which are also situated onboard the vehicle. For example, the virtual media client and the user media clients onboard the vehicle may be situated on the same side of a satellite communications link. Thus, any transmission-related issues experienced by user media clients may also be experienced by the virtual media client.

Virtual media clients may advantageously allow for access to performance data onboard a vehicle even when user media clients onboard the vehicle are unable to provide performance data for any of a variety of reasons. For example, a user media client may have privacy restrictions which prevent collecting of performance data from the user media client. In such cases, the virtual media client may act as a proxy for the user media client, as performance data collected from the virtual media client may be an accurate representation of quality of experience at the user media client.

Various performance data related to communication services onboard mobile platforms may be collected and/or analyzed for various purposes, for example to improve and/or maintain performance of the communication services. In some embodiments, collected performance data may be analyzed to generate one or more quality of experience scores. Performance data may include various raw data (e.g., startup delay and/or rebuffer data) collected from media clients onboard a vehicle. The performance data may be transmitted from one or more virtual media clients and/or user media clients onboard the vehicle and may be collected by one or more scoring subsystems situated onboard the vehicle (e.g., as part of an onboard server) and/or situated remotely from the vehicle (e.g., as part of an on-ground server). A scoring subsystem may be configured to analyze the performance data to generate one or more quality of experience scores related to the performance data. For example, the scoring subsystem may be configured to apply one or more thresholds to the performance data to determine whether the values indicated in the performance data meet, exceed, or fall below the one or more thresholds. In some embodiments, the scoring subsystem may be configured to analyze values indicated in the performance data with an associated time component which may involve using time stamps and/or other time values associated with the performance data values. For example, the scoring subsystem may be configured to determine a number of buffer/rebuffer events over a period of time (e.g., one minute, thirty minutes) and/or compare the determined number to a threshold number of buffer/rebuffer events over the period of time. As another example, the scoring subsystem may be configured to determine the total rebuffering duration of the rebuffer events and compare that to a threshold duration.

In some cases, performance data may be collected from PEDs and/or other media clients used by passengers and/or crew members onboard mobile platforms during, for example, trips (e.g., flights) of the mobile platforms. However, performance of communication services at some media clients may be affected at least in part by the software and/or hardware of the media clients. For example, a lower-end media client and/or a media client running an outdated operating system may provide results indicative of relatively poor performance in comparison to a high-end media client and/or a media client running a newer operating system. The relatively poor performance may be caused by various factors at the media client (e.g., memory, processing power, etc.) and may not be indicative of the performance of the communication services (e.g., provided by on-ground and/or onboard servers) generally. Moreover, some software and/or hardware may be more suited for certain communication systems than others. For example, a communication system may be designed for use with iOS devices and may experience more performance issues for Android devices. Accordingly, it would be advantageous for collection of performance metrics for communication services provided onboard mobile platforms to have a unified baseline measurement process via one or more virtual media clients.

Furthermore, in some cases, user media clients may prevent transmission of performance data. For example, a user media client may utilize privacy software which may not allow performance data to be shared with one or more servers and/or a scoring subsystem. In such cases, a virtual media client may provide performance data in place of user media clients incapable of providing performance data. In some embodiments, only performance data from one or more virtual media clients may be collected by a scoring subsystem for generation of quality of experience data. For example, performance data transmitted by one or more user media clients may be disregarded and/or actively excluded from analysis by the scoring subsystem. In this way, generated quality of experience data may not be reflective of performance data from user media clients which may be negatively affected due to operating system types, operating system conditions, privacy restrictions, and/or various other factors.

Communication services provided onboard mobile platforms may be provided by various communication system devices located onboard the mobile platform and/or outside the mobile platform. Various linear media channels may be transmitted through use of the Internet and/or other network. Internet and/or other network services may be provided through use of a modem and/or other device(s) onboard the mobile platform which may be in communication with a satellite and/or other device external to the mobile platform. Linear media channels for presentation on a vehicle or other mobile platform can originate from disparate remote sources, such as remote (e.g., on-ground) servers. For vehicle onboard content presentation platforms and/or other mobile platforms, server(s) may be locally installed, wherein such server(s) can receive the content for presentation as one or more data transfer packages from one or more remote media servers. For example, an onboard server may be configured to pull in various content services and solutions together to provide a desirable end user experience for passengers onboard the vehicle or other mobile platform. Linear media channels may be received from one or more on-ground servers, which in turn may receive the different types of content items from different content sources.

One or more servers may be configured to provide data, including linear media channels and/or interface data, to media clients. The one or more servers may be situated within a vehicle (e.g., an airplane) and/or outside of a vehicle (e.g., on-ground). In some embodiments, a server that is on-ground and/or otherwise outside of a vehicle may be configured to establish network communication with one or more servers onboard a vehicle. While some embodiments described herein may distinguish between servers onboard a vehicle and servers not onboard a vehicle, some functions performed by such servers may be interchangeable and/or may be capable of being performed at both servers and/or either server.

Network Overview

In some implementations, the present disclosure provides systems, processes, and devices that provide for quality of experience evaluation related to a communication service provided onboard a mobile platform (e.g., a vehicle). FIG. 1 illustrates a system 100 for managing transmission of data between a mobile platform 105, such as a vehicle, and/or a server 120 onboard the mobile platform 105 and an on-ground server 130, in accordance with one or more embodiments. Various data may be stored in an on-ground data store 140 and/or an onboard data store 170 onboard the mobile platform 105. Types of data stored at the on-ground server 130 and/or at the mobile platform 105 are described in further detail in FIGS. 2 and 3. The on-ground data store 140 and/or onboard data store 170 may comprise non-volatile data storage.

The system 100 includes onboard control circuitry 121 and/or a virtual media client 125, which may be installed in, and/or disposed on or in, a mobile platform 105, such as an aircraft, cruise ship, automobile, or other vehicle or the like. While the virtual media client 125 is shown as being part of the onboard server 120, the virtual media client 125 may alternatively be implemented in another onboard component external to the onboard server 120. In some embodiments, the virtual media client 125 may be configured to communicate with the onboard server 120 via a wired and/or wireless connection.

Although certain embodiments are disclosed herein in the context of aircraft, or other vehicles, it should be understood that the principles disclosed herein may be applicable to any suitable or desirable mobile platform or vehicle. The onboard server 120 may be configured to transmit, receive, and/or otherwise manage data onboard the mobile platform 105. For example, the onboard server 120 may be configured to transmit media data to various onboard communication service devices. "Communication service devices" may include any devices configured to facilitate provision of a passenger service at a mobile platform and may include one or more modems, transceivers, antennas, WAPs, and/or other onboard service devices. In some embodiments, the onboard server 120 may be configured to receive and/or filter performance data transmitted from the media service devices and/or media clients, including the virtual media client 125, onboard the mobile platform 105.

Performance data received from various communication service devices and/or media clients onboard the mobile platform 105 may relate to a communication service provided on the mobile platform 105. In some embodiments, performance data may comprise performance data values relating to any of a variety of performance data (for example, quality of experience data), which may include startup data and/or rebuffer data, among others.

The on-ground server 130 and/or onboard server 120 may comprise a scoring subsystem configured to analyze performance data received from one or more communication service devices and/or media clients. In some embodiments, the scoring subsystem may be configured to receive performance data, make adjustments to the data (e.g., associate performance data with a period of time during which the performance data was generated), and/or calculate one or more quality of experience scores (e.g., by comparing the performance data and/or adjusted performance data to various thresholds). The scoring subsystem may be situated onboard the vehicle 105 and/or outside the vehicle 105 (e.g., on-ground). In some embodiments, a first scoring subsystem may be situated onboard the vehicle 105 (e.g., as part of the onboard server 120) and a second scoring subsystem may be situated outside of the vehicle 105 (e.g., as part of the on-ground server 130). In some embodiments, a scoring subsystem situated on-ground may be configured to aggregate performance data from multiple vehicles and/or to compare performance data from the multiple vehicles to identify vehicles experiencing issues. For example, if performance data from a first vehicle 105 within a beam of a satellite 110 indicates good performance while performance data from a second vehicle within the beam of the satellite 110 indicates poor performance, the scoring subsystem may be configured to determine that an issue exists at the second vehicle rather than at the satellite 110. In some cases, the system 100 may include at least a scoring subsystem at the on-ground server 130 to make use of computing resources on-ground.

In some embodiments, the obtaining of various data (e.g., performance data, request data, etc.) may be performed at least in part over a network connection external to the vehicle 105, such as through a satellite network 112 connection and/or another type of network connection 123 with the Internet or other network 122 (e.g., Wi-Fi or other network connection). The network 112 connection may include a communication path between a satellite 110 and a gateway 115. The gateway 115 may be in data communication with the satellite 110 as well as to the network 122, and thereby to the on-ground server 130. The mobile platform 105 may be configured to receive a forward downlink signal from the satellite access network 112 including the satellite 110 and gateway 115, and to transmit a return uplink signal to the satellite-based access network 112 using the satellite 110 and the gateway 115.

The network 122 can be any type of network and can include, for example, one or more of: the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein. Furthermore, the network 122 can include wired (e.g., copper and optical) and/or wireless (e.g., radio and microwave) connections.

The mobile platform 105 is illustrated in FIG. 1 as an airplane, and certain embodiments are disclosed herein in the context of airplanes, fleets of airplanes, and/or airlines. However, it should be understood that embodiments of the present disclosure are applicable to other types and/or groupings of mobile platforms, and/or associated entities.

As described above, with respect to the mobile platform 105, the on-ground server 130 may represent a remote server. Although referred to herein as an on-ground server, the server 130 may be physically disposed and/or situated in any physical location; use of the term "on-ground" herein is for simplicity and convenience to indicate that the on-ground server 130 is not disposed on or at the mobile platform 105, but rather external thereto at some location. The on-ground server 130 may be understood with respect to the on-ground server 230 of FIG. 2, which may constitute an example embodiment of the on-ground server 130 of FIG. 1. With respect to FIG. 1, various data (e.g., media content items) can be obtained by the mobile platform 105 from the on-ground server 130 via the network 122 or other terrestrial stations, gateways, or other network nodes, or the like.

One or more users 114 (e.g., passengers, crew members) may be onboard the mobile platform 105 and may use one or more media clients 116 (e.g., PEDs, seatback entertainment systems, crew member devices, etc.) to access the communication service provided onboard the mobile platform 105. Via the communication service, the media clients 116 may be configured to transmit and/or receive performance data, media data, and/or request data.

On-Ground Server

Figure 2:
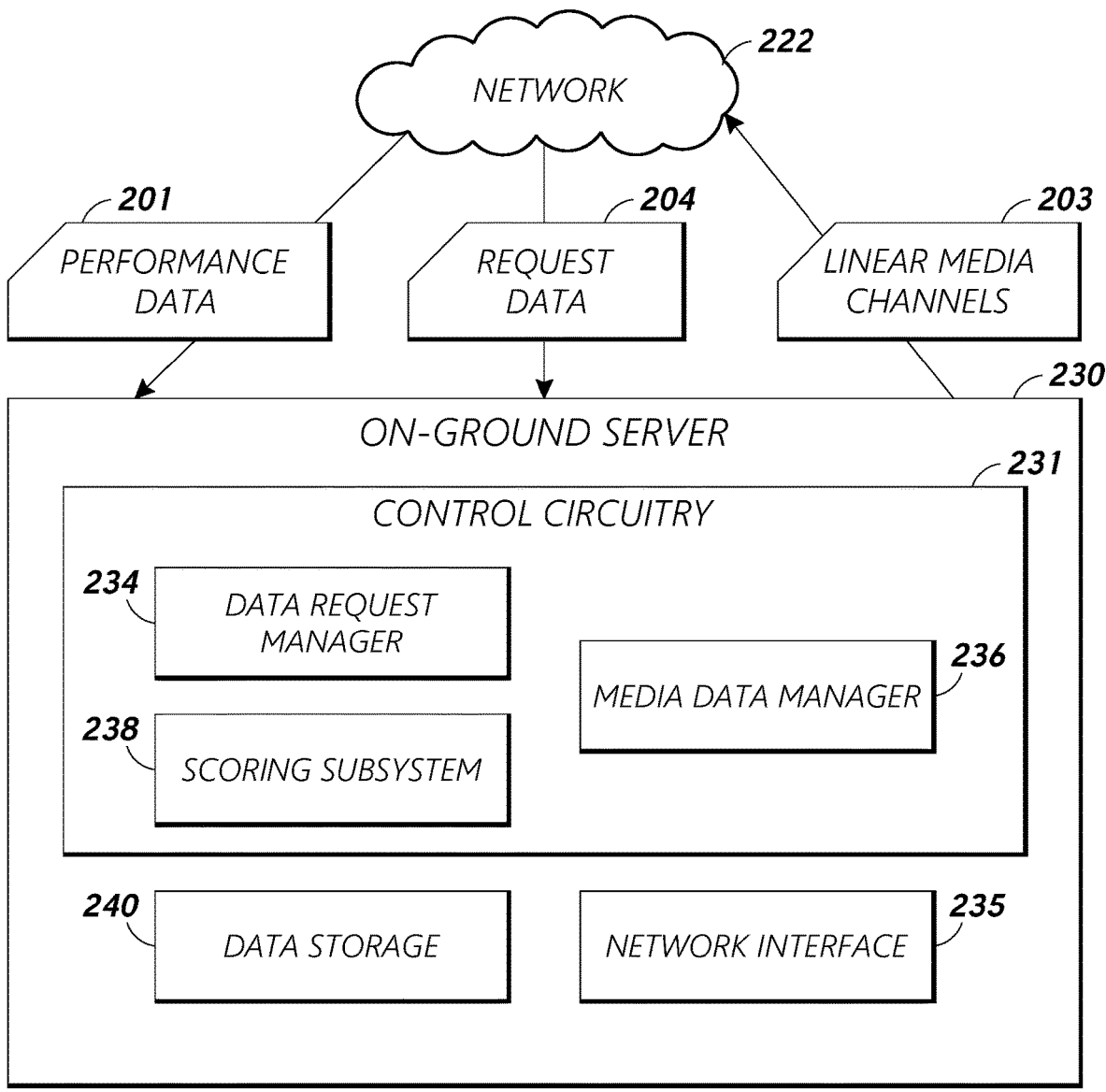
FIG. 2 illustrates an on-ground server in accordance with one or more embodiments.

With reference to FIG. 2, the on-ground server 230 may comprise control circuitry 231, which may comprise any of a variety of components configured to perform any of a variety of functions. The on-ground server 230 may be configured to generate and/or transmit various linear media channels 203 (e.g., linear media channels) via a network 222 for use by servers onboard mobile platforms. In some embodiments, the on-ground server 230 may be configured to receive various data, including performance data 201 and/or request data 204, from mobile platforms via the network 222. The performance data 201 and/or request data 204 may be related to a passenger service provided on particular mobile platforms (e.g., the mobile platform 105 of the system 100 described with respect to FIG. 1). The on-ground server 230 may comprise data storage 240 that may be combined with the on-ground server 230 into a single device or may be a different device that may be external to the on-ground server 230.

The network 222 may comprise a wide area network, such as the Internet, which may be accessed by a mobile platform via a satellite communication network. Therefore, the communication link between the on-ground server 230 and a remote mobile platform may be achieved over the Internet or other wide area network. Transmission and/or reception of data between the network 222 and the on-ground server 230 may be facilitated via a network interface 235 configured to establish a network connection between the network 222 and the on-ground server 230.

In some embodiments, the on-ground server 230 may comprise a data request manager 234 configured to manage incoming request data 204 from mobile platforms. Some request data 204 may comprise requests for linear media channels 203, including one or more linear media channels. In some embodiments, request data 204 may be generated and/or transmitted from servers onboard mobile platforms in response to received media requests from media clients and/or attempts at media clients onboard the mobile platforms to access certain linear media channels 203. In other embodiments in which the on-ground server 230 automatically transmits all the linear media channels (broadcast) irrespective of the request data, the request data 204 may not be transmitted from servers onboard mobile platforms. The data request manager 234 may be configured to determine content of request data 204, including which linear media channels 203 may be identified and/or specified in the request data 204. In some embodiments, a server (e.g., the onboard server 120 of FIG. 1) onboard a mobile platform may be configured to aggregate received media requests to generate the request data 204. For example, aggregation may involve collecting media requests and/or removing duplicate media requests (e.g., media requests identifying/specifying an identical linear media channel).

In some embodiments, the on-ground server 230 may be configured to transmit linear media channels 203 via transmission beams. Each beam may be configured to cover a wide geographic area and various mobile platforms may pass in and out of beams as they progress through trips (e.g., flights, in the case of aircrafts). In some embodiments, a beam generated by an on-ground server 230 may be configured to provide a particular set of linear media channels 203 to mobile platforms within the beam and/or specifically to mobile platforms that are part of a given "beam group." In some cases, only mobile platforms included in a particular beam group may be configured to receive linear media channels 203 transmitted via a given beam. Servers onboard mobile platforms may be configured to transmit request data 204 to request being added to a beam group associated with the on-ground server 230.

Media data transmitted via a beam may be available to any mobile platforms within the beam and/or part of a beam group for the beam. For example, the on-ground server 230 may transmit a particular linear media channel (among other media data) in a beam. Any mobile platforms within the geographic area of the beam and/or selectively included in a beam group associated with the beam may be able to receive the particular linear media channel. In some embodiments, a mobile platform may be required to request a particular linear media channel (or other linear media channels 203) before receiving the particular linear media channel. For example, the on-ground server 230 may be configured to transmit a first linear media channel (e.g., a live television channel) as part of a first beam. A mobile platform traveling within a beam of the on-ground server may transmit request data 204 indicating a request to receive the first linear media channel from the on-ground server 230. In response to receiving the request, the data request manager 234 may be configured to add the mobile platform to a list of mobile platforms selected to receive the first linear media channel. Accordingly, the mobile platform may be configured to receive the first linear media channel in response to being selected at the on-ground server 230.

In some embodiments, the on-ground server 230 may comprise a media data manager 236 component configured to manage transmission of linear media channels 203 to mobile platforms. Linear media channels 203, including linear media channels, may be transmitted from the on-ground server 230 in response to request data 204 transmitted from mobile platforms. For example, if a media client onboard a mobile platform sends a request to the onboard server for a linear media channel not presently offered by the onboard server, the onboard server may transmit request data 204 to the on-ground server 230 to obtain access to the requested linear media channel. The media data manager 236 may be configured to transmit the requested linear media channel (e.g., as part of a beam) and/or may select the mobile platform that transmitted the request as being enabled to receive the requested linear media channel.

The media data manager 236 may be configured to transmit linear media channels 203 as a multicast, which may include multiple linear media channels and/or other linear media channels 203 sets. In some embodiments, only requested linear media channels may be included in a beam transmitted by the on-ground server 230 and/or the media data manager 236. If a linear media channel not included in a beam is requested in request data 204, the linear media channel may be added to the beam by the media data manager 236. In some embodiments, the on-ground server 230 and/or media data manager 236 may be configured to include all linear media channels in a beam without requiring request data.

In some embodiments, the on-ground server 230 may be configured to obtain performance data 201 from mobile platforms (e.g., from servers onboard mobile platforms). Performance data 201 may include startup delay data, which may represent a time difference between a click event at a media client and a display of a first frame of a linear media channel 203 at the media client. Startup delay may be based at least in part on processing power of media clients, as varying processing systems may require different amounts of decoding time. In some cases, performance data 201 may be processed (e.g., compared with threshold performance values) to generate one or more quality of experience scores associated with the performance data 201. For example, performance data 201 indicating startup delays of more than five seconds may be noted and/or stored in data storage 240. Performance data 201 may also or alternatively include rebuffer data, which may represent a number of rebuffer events and/or rebuffering duration experienced during streaming of linear media channels 203 during a trip of a mobile platform. In some embodiments, rebuffer count data indicating greater than three rebuffer events per hour may be considered poor performance.

In some embodiments, performance data 201 may comprise user-provided feedback. For example, users of media clients may be prompted to provide feedback indicating the quality of experience of the user and/or of the media client during a trip of a mobile platform. Performance data 201 related to all linear media channels 203 transmitted to the mobile platforms may be received and/or a subset of the linear media channels 203 transmitted to the mobile platforms may be received at the on-ground server 230. For example, mobile platforms may transmit only performance data 201 related to certain linear media channels or may transmit performance data 201 for all linear media channels.

The on-ground server 230 and/or a server onboard a vehicle may comprise a scoring subsystem 238 configured to receive performance data 201 and/or generate one or more quality of experience (QOE) scores based on the received performance data 201. For example, performance data 201 may include raw startup delay data and/or rebuffer data which may be compared to threshold values to determine an impact on user experience. Generating QOE scores may involve combining, aggregating, adjusting, and/or comparing the performance data 201 as needed to evaluate the quality of experience for users on one or more vehicles.

The scoring subsystem 238 may be configured to aggregate performance data 201 generated by one or more user media clients (e.g., PEDs) onboard a vehicle and/or compare aggregated performance data 201 received from one or more user media clients to performance data 201 generated by one or more virtual media clients onboard the vehicle. In some embodiments, comparisons between performance data 201 from user media clients and performance data 201 from virtual media clients may be used to determine a confidence level of the one or more virtual media clients and/or to modify the one or more virtual media clients to increase the confidence level. For example, the scoring subsystem 238 may aggregate performance data 201 from multiple user media clients onboard a vehicle having a first operating software (e.g., an iOS operating system) to generate a first QOE score of 95%. The scoring subsystem 238 may additionally receive performance data 201 from a virtual media client onboard the vehicle configured to run the first operating software to generate a second QOE score of 98%. The scoring subsystem 238 may be further configured to generate a confidence score for the virtual media client by subtracting the absolute value difference between the first QOE score and the second QOE score from 100%, resulting in a confidence score of 100%-abs(95%-98%)=97%. The confidence score may indicate a level of accuracy of the performance data 201 generated by the virtual media client to actual quality of experience of user media clients onboard the vehicle. The confidence scores can indicate how representative the performance data from the virtual media client is of the performance data from the user media clients. The performance score can be used by the scoring subsystem 238 to determine when to perform a training operation (discussed below), and also to determine when the training operation is successful. The scoring subsystem 238 may be configured to generate confidence scores for multiple operating systems (e.g., iOS and Android) over a number of flights and the various confidence scores may be aggregated to generate an overall confidence score for the virtual media client. Various modifications may be made to the scoring subsystem 238 based on the confidence score(s) to improve the accuracy of computing the QOE score when only using performance data from the virtual media client. In some embodiments, more than one instance of a particular operating system may be run at the virtual media client sequentially and/or simultaneously and the scoring subsystem 238 may be configured to generate confidence scores for each instance of the operating system. The various generated confidence scores may be compared to determine an operating system and/or instance of an operating system most closely reflecting quality of experience of user media clients onboard a mobile platform.

The scoring subsystem 238 may be configured to generate QOE scores on a per-passenger (e.g., per-PED), per-trip (e.g., per-flight), per-vehicle, per-satellite beam, and/or per-fleet (e.g., fleet of aircraft) basis. In some embodiments, the scoring subsystem 238 may be configured to generate QOE scores on a per-passenger and per-trip basis and/or may aggregate QOE scores across an entire vehicle and/or fleet of vehicles. For example, the scoring subsystem 238 may be configured to generate individual QOE scores from performance data 201 received from each user media client and/or virtual media client onboard one or more vehicles. Once each of the individual QOE scores have been generated, the scoring subsystem 238 may be configured to aggregate the individual QOE scores to generate an overall QOE score for all media clients onboard a vehicle and/or all media clients onboard multiple vehicles.

In some embodiments, the scoring subsystem 238 may be configured to calculate one or more QOE scores during and/or after a trip of a vehicle. For example, performance data 201 may be received from a vehicle once per trip, multiple times per trip (e.g., every two minutes), once per day, etc. Whenever performance data 201 is received, the scoring subsystem 238 may be configured to generate one or more QOE scores based on the received performance data 201.

User media clients and/or virtual media clients onboard vehicles may similarly be configured to generate and/or transmit performance data 201 in response to particular events and/or on a periodic basis. For example, a user media client may be configured to generate performance data 201 in response to a start of streaming of one or more linear media channels 203 at the user media client. A virtual media client may be configured to generate performance data 201 in response to a start of streaming and/or on a periodic basis (e.g., every two minutes).

In some embodiments, the scoring subsystem 238 may be configured to collect and/or aggregate performance data 201 generated over any suitable period of time in generating one or more QOE scores. The time period over which the performance data 201 is collected may be large enough that a sample of performance data 201 may include one or more instances of relatively infrequent events (e.g., rebuffer events) for calculating QOE scores. For example, performance data 201 indicating a rebuffer event occurring once every thirty minutes may result in a much better QOE score than performance data 201 indicating a rebuffer event once every five minutes. Accordingly, it may be advantageous to collect performance data 201 over a sufficient period of time (e.g., thirty minutes) to accurately determine QOE. In some embodiments, the scoring subsystem 238 may be configured to determine a success level of a number of performance data 201 metrics (e.g., startup delay data, rebuffer count data, rebuffer duration data) over a given period of time. For example, the scoring subsystem 238 may be configured to determine that a media client and/or a group of media clients experienced less than a given number of rebuffer events per two-hour period of streamed linear media channels 99% of the time.

The scoring subsystem 238 may be configured to associate a set of performance data 201 with a device type of the media client reporting the set of performance data 201. For example, performance data 201 indicating a startup delay of more than five seconds may be associated with the type of media client that reported and/or experienced the startup delay. In this way, the scoring subsystem 238 may be configured to determine if poor performance can be attributed to a particular type of media client rather than to a communication service in general.

In some embodiments, QOE scores may be generated onboard mobile platforms based on performance data 201 collected at the mobile platforms. The scoring subsystem 238 and/or a similar device onboard a mobile platform may be configured to generate QOE scores for all performance data 201 received and/or for a subset of performance data 201 received (e.g., performance data 201 indicating values above and/or below given thresholds and/or performance data 201 stored at the data storage 240).

QOE scores generated by the scoring subsystem 238 may be indicative of user experience with respect to transmitted linear media channels 203 at mobile platforms. In some embodiments, the scoring subsystem 238 and/or other component of the on-ground server 230 may be configured to perform one or more alerting functions in response to generating a relatively low QOE score and/or a QOE score that drops below or exceeds a threshold score value. The one or more alerting functions may be configured for use in determining a root cause of the low score.

The manner in which a QOE score may be modeled can vary from embodiment to embodiment. In some embodiments, a database can be built at the data storage 240 of individual media clients providing feedback of QOE at the media client. The scoring subsystem 238 may be configured to match the feedback up against QOE evaluations performed at mobile platforms. When a sufficient amount of data samples have been obtained from the media clients onboard mobile platforms (including, for example, a virtual media client onboard the mobile platform), the performance data 201 in the database can be used as a reference to determine a QOE score based at least in part on computations performed at the on-ground server 230 and/or a server and/or virtual media client onboard a mobile platform.

In some embodiments, the scoring subsystem 238 may be configured to be trained via a training operation using for example machine-learning. For example, performance data 201 collected from a given media client may be compared to aggregated performance data 201 for a collection of media clients (e.g., all media clients onboard a given mobile platform). Machine learning may be utilized to determine discrepancies between data for a specific media client and aggregated data for a group of media clients. For example, a first media client may report a startup delay of 3.2 seconds while a group of media clients may report an aggregated startup delay of 3.4 seconds. Performance data 201 for the first media client can be measured against high-end media clients comprising modern and/or relatively powerful operating systems to determine how the first media client compares to the high-end media clients. In some embodiments, algorithms may be utilized to determine a device type (e.g., "high-end" or "low-end") of the first media client. Accordingly, QOE scores generated by the scoring subsystem 238 for the first media client may be tailored, weighted, and/or otherwise based at least in part on the determined device type of the first media client. In some embodiments, generated QOE scores for a group of media clients (e.g., all media clients onboard a mobile platform) may be weighted and/or otherwise based at least in part on the device types of the media clients.

In some embodiments, the scoring subsystem 238 may be configured to compare performance data 201 related to a first media client to performance data 201 related to a second media client. Such device-to-device comparisons may be used to detect malfunctioning of the first media client, second media client, and/or other media clients. In some embodiments, median performance data 201 values may be used to exclude outlier performance data 201 for particular media clients. For example, the scoring subsystem 238 may be configured to exclude performance data 201 values that are abnormally high and/or low in aggregating the performance data 201 and/or generating one or more QOE scores based on the performance data 201.

Some sets of linear media channels 203 may be coded at different bit rates than others. For example, a first linear media channel 203 (e.g., a News channel) may have a relatively low bit rate while a second linear media channel 203 (e.g., a Sports channel) may have a relatively high bit rate. In optional embodiments, users may be able to select a bit rate for a given set of linear media channels 203 and/or the on-ground server 230 and/or an onboard server may be configured to select a bit rate for linear media channels 203 in response to performance evaluations. For example, in poor transmission conditions, a lower bit rate may be utilized.

Flight View

Figure 3:
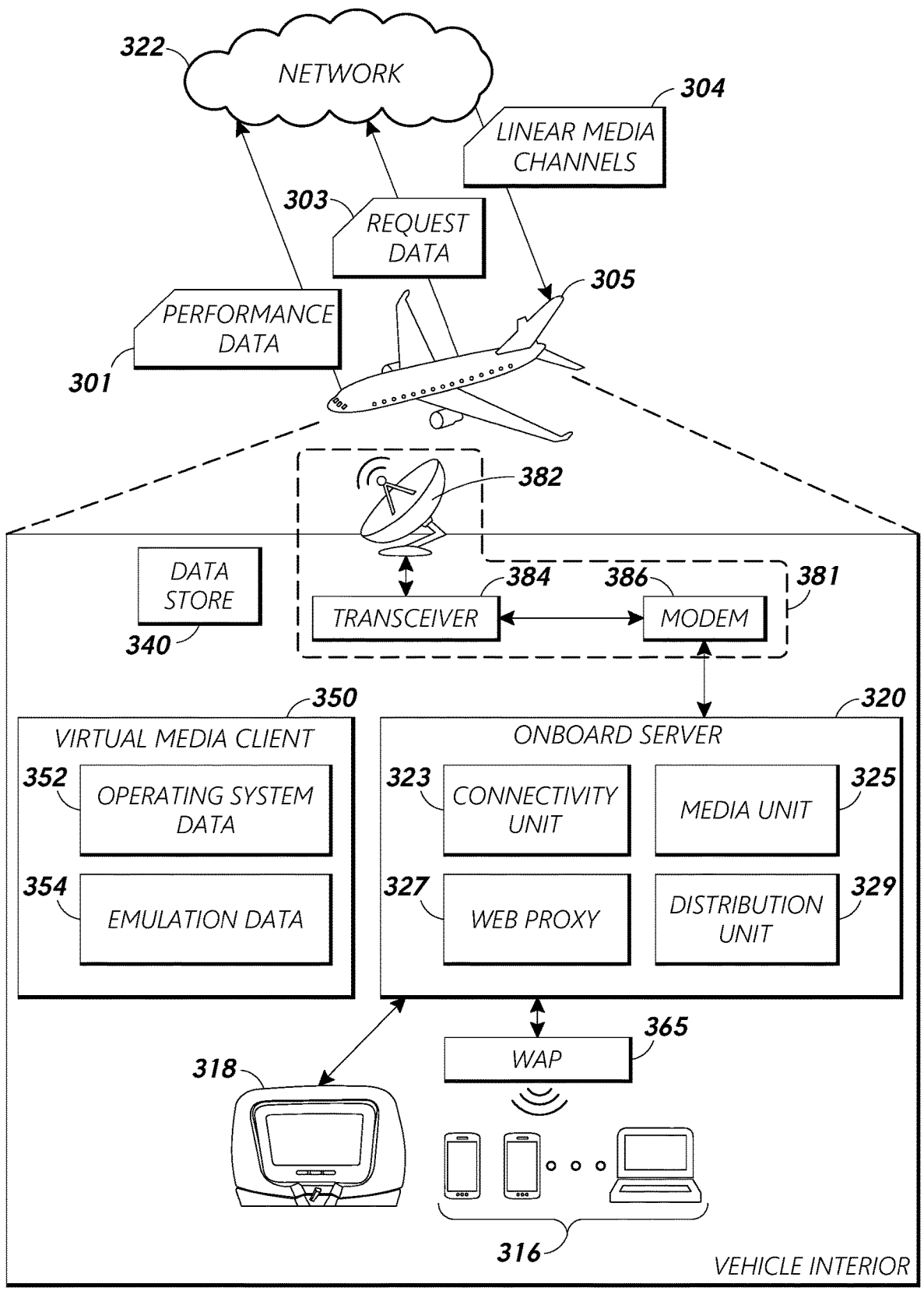
FIG. 3 illustrates an onboard monitoring system in accordance with one or more embodiments.

FIG. 3 illustrates an onboard data monitoring system associated with a vehicle/mobile platform 305 in accordance with one or more embodiments. The onboard monitoring system comprises an onboard server 320 and an associated onboard data store 340, which may comprise non-volatile data storage media and/or may be configured to store certain data including performance data 301, request data 303, and/or linear media channels 304. While the onboard server 320 and onboard data storage 340 are shown as separate components in FIG. 3, the onboard server 320 and onboard data storage 340 may be combined into a single device or may be different devices.

The mobile platform 305 may comprise a network access terminal 381 (i.e., network interface) for establishing a connection with an external access network, such as a satellite network, cellular network, or other network. The network access terminal 381 comprises one or more of an antenna 382, a transceiver 384, and a modem 386, for facilitating network communications. The antenna 382 may be in communication with the transceiver 384, which may be in communication with the modem 386. A wireless access point (WAP) 365 may be in communication with the onboard server 320 and/or other network access components (not shown). One or more user media clients onboard the mobile platform 305, including PEDs 316 and/or seat-back entertainments systems 318, may comprise control circuitry configured to execute one or more applications for obtaining and/or consuming linear media channels 304 stored in the data store 340 and/or obtained from remote servers via the network 322. In some embodiments, users may have the option to select/request one or more media content items using a user media client.

In some embodiments, the onboard server 320 may be configured to service a plurality of media clients (e.g., PEDs 316 and/or seat-back entertainment systems) onboard the mobile platform. For example, the onboard server 320 may be configured to receive and/or aggregate media requests from a plurality of media clients. Moreover, the onboard server 320 may be configured to transmit media channels (e.g., linear media channels 304) received from a remote server to the plurality of media clients. In some embodiments, the onboard server 320 may be configured to transmit a common media channel to multiple media clients and/or may be configured to transmit different media channels to different media clients.

The network access terminal 381 may provide connectivity between the onboard server 320 and one or more on-ground servers, for example, via a satellite and gateway (see FIG. 1). In some embodiments, the onboard server 320 may be configured to transmit and/or obtain data from various media clients and/or service access devices (e.g., WAPs 365) onboard the vehicle 305 via the network access terminal 381 or other network interface for transmission and/or reception of performance data 301, request data 303, and/or linear media channels 304. In some embodiments, the network access terminal 381 may be configured to establish one or more wired and/or wireless connections with the media clients and/or service access devices onboard the mobile platform 305. Media clients may be configured to transmit media requests to the onboard server 320 and/or remote servers (e.g., via one or more connections established by the network access terminal 381). The onboard server 320 may be configured to aggregate received media requests to generate request data 303 and/or transmit the request data 303 to a remote server. In some embodiments, aggregating media requests may involve removing duplicate media requests. The network access terminal 381 may be configured to establish multiple connections between various devices, including media clients, service access devices, and the onboard server 320.

For convenience, the following description refers to the mobile platform 305 as a vehicle, such as an airplane. The user media clients 316, 318 disposed within the vehicle 305 can include any type of PEDs (e.g., smartphones, laptops, tablets, netbooks, and the like) brought onto the vehicle 305 by passengers, as well as passenger seatback systems 318 and/or other devices on the vehicle 305. The user media clients 316, 318 can be configured to communicate with the onboard server 320 via a communication link that can be wired and/or wireless. The communication link can be, for example, part of a local area network, such as a wireless local area network (WLAN) supported by one or more WAPs 365 onboard the vehicle 305. One or more WAPs 365 can be distributed about the vehicle 305, and can, in conjunction with the server 320, provide traffic switching and routing functionality; for example, as part of a WLAN extended service set (ESS), etc.

Passengers on the vehicle may interface with the onboard server 320 in any suitable or desirable way. For example, linear media channels 304 may be presented to passengers using electronic displays of PEDs 316 associated with the passengers, such as through a web browser application, native application, or the like, or using an interface associated with a vehicle-integrated media system, such as the seatback media system 318. The onboard server 320 may be configured to serve as a media delivery system and/or content server for providing linear media channels 304 for presentation using the PEDs 316 and/or presentation systems associated with the vehicle 305 (e.g., seatback media presentation devices or systems 318).

In some embodiments, users may provide input (e.g., a selection of a linear media channel 304) into a PED 316 and/or media system 318 to request streaming of a linear media channel 304 at the PED 316 and/or media system 318. In response to the user input, the PED 316 and/or media system 318 may be configured to transmit one or more requests to the onboard server 320 indicating the requested linear media channel 304. In response to such requests, the onboard server 320 may request the linear media channel 304 by transmitting request data 303 indicating the requested linear media channels 304 to a remote server. When the linear media channel 304 is received at the onboard server 320, the onboard server 320 may provide the linear media channel 304 to the PED 316 and/or media system 318. If the requested linear media channel 304 is already available at the onboard server 320 (e.g., the linear media channel 304 has already been received from the remote server in response to a request from a different user), the onboard server 320 may be configured to distribute the linear media channel 304 to the PED 316 and/or media system 318 directly in response to the request from the PED 316 and/or media system 318 without transmitting a request to the remote server.

The onboard server 320 may comprise control circuity for implementing functionality in accordance with embodiments of the present disclosure. In some embodiments, the onboard server 320 may be configured to serve as an aggregation and/or distribution point of linear media channels 304, performance data 301, and/or request data 303.

As shown in FIG. 3, the onboard server 320 may comprise a connectivity unit (e.g., an in-flight connectivity (IFC) unit for aircraft), a media unit 325 (e.g., an in-flight entertainment (IFE) unit for aircraft), a web proxy 327, and a content distribution unit 329. The connectivity unit 323 may be configured to provide connectivity between the network 322 and the media clients and/or service access devices onboard the mobile platform 305. The media unit 325 may be configured to provide various linear media channels 304, including movies and other on-demand content to media clients onboard the mobile platform 305. The web proxy 327 may be configured to manage certain media requests for linear media channels from media clients onboard the mobile platform 305. For example, if a user and/or media client transmits a media request specifying a linear media channel (e.g., a live television channel) that is available (e.g., provided to the mobile platform 305 via a beam from a remote server), the web proxy 327 may be configured to provide the requested linear media channel to the media client. If a media client transmits a media request identifying/specifying a linear media channel that is not currently available, the distribution unit 329 may be configured to generate and/or transmit request data 303 to a remote server and/or provide the requested linear media channel when provided by the remote server.

In some embodiments, the onboard server 320 may be configured to receive performance data 301 from one or more media clients (including, e.g., a virtual media client 350 and/or user media clients) onboard the mobile platform 305. The onboard server 320 may be further configured to transmit performance data 301 obtained from media clients onboard the mobile platform to one or more remote servers.

One or more virtual media clients 350 may be situated onboard the mobile platform 305. While the virtual media client 350 is shown in FIG. 3 as a separate device from the onboard server 320, the virtual media client 350 may be a component of the onboard server 320 and/or may be connected to the onboard server 320 via a wired and/or wireless connection. The onboard server 320 may be configured to transmit at least a single linear media channel and/or multiple linear media channels to the virtual media client 350. In some embodiments, a linear media channel provided by the onboard server 320 to the virtual media client 350 may also be transmitted by the onboard server 320 to one or more user media clients (e.g., PEDs 316 and/or seat-back systems 318) onboard the mobile platform 305.

In some cases, performance data 301 obtained at the onboard server 320 from user media clients (including, e.g., PEDs 316 and entertainment systems 318) may provide non-uniform and/or unreliable data. For example, a lower-end PED 316 may experience very different quality of experience results compared to higher-end PED 316. The differences in performance of the lower-end PED 316 and the higher-end PED 316 may be due to any of a variety of factors, including memory and processing power, among many others. Accordingly, the various PEDs 316 onboard the mobile platform 305 may not be able to provide a unified and/or reliable sample indicative of the performance of a communication service provided onboard the mobile platform 305.

In some embodiments, one or more virtual media clients 350 may be configured to provide a central and/or unified process for generating performance data 301 for evaluation at the onboard server 320 and/or at one or more remote servers. In some embodiments, a virtual media client 350 may be configured to mimic and/or emulate performance of different types of devices. For example, the virtual media client 350 may be configured to store operating system data 352 to allow the virtual media client 350 to stream linear media channels 304 using various operating systems. For example, the virtual media client 350 may be configured to stream linear media channels 304 using an Android operating system and/or an iOS operating system. In some embodiments, the virtual media client 350 may be configured to run multiple operating systems simultaneously or sequentially and/or play different sets of linear media channels 304 simultaneously or sequentially using different or identical operating systems. The virtual media client 350 may be further configured to store emulation data 354 to allow the virtual media client 350 to emulate a variety of media software, including web/network browsers, applications, and/or media players. For example, the virtual media client 350 may be configured to use the emulation data 354 to stream one or more linear media channels 304 using a set of commands and/or operations that may be similar and/or identical to commands and/or operations associated with one or more operating systems, network browsers, media players, etc.

The use of different operating system data 352 and/or emulation data 354 at the virtual media client 350 may allow for detection of discrepancies that may be due to different operating systems. For example, the virtual media client 350 may be configured to generate a first set of performance data 301 using a first operating system and a second set of performance data 301 using a second operating system. A scoring subsystem onboard the mobile platform 305 and/or at an on-ground server may be configured to generate a first QOE score for the first set of performance data 301 and a second QOE score for the second set of performance data 301. If there is a large discrepancy between the first QOE score and the second QOE score, it may be determined that an issue exists with the operating system associated with the lower QOE score.

In some embodiments, comparisons between a first set of performance data 301 from one or more PEDs 316 and/or entertainment systems 318 and a second set of performance data 301 from one or more virtual media clients 350 may be used to determine a confidence level of the one or more virtual media clients 350 and/or to modify the one or more virtual media clients 350 to increase the confidence level. For example, the onboard server 320 and/or a remote server may aggregate performance data 301 from multiple PEDs 316 and/or entertainment systems 318 onboard the mobile platform 305 having a first operating software (e.g., an iOS operating system) to generate a first QOE score of 95%. The onboard server 320 and/or remote server may additionally receive performance data 301 from the virtual media client 350 onboard the mobile platform 305 also having the first operating software to generate a second QOE score of 98%. The onboard server 320 and/or remote server may be further configured to generate a confidence score for the virtual media client 350 by subtracting the absolute value difference between the first QOE score and the second QOE score from 100%, resulting in a confidence score of 100%—abs(95%-98%)=97%. The confidence score may indicate a level of accuracy of the performance data 301 generated by the virtual media client 350 to actual quality of experience of one or more PEDs 316 and/or entertainment systems 318 onboard the mobile platform 305. The onboard server 320 and/or a remote server may be configured to generate confidence scores for multiple operating systems (e.g., iOS and Android) over a number of trips and the various confidence scores may be aggregated to generate an overall confidence score for the virtual media client 350. Various medications may be made to the virtual media client 350 based on the confidence score(s) to improve the performance of the virtual media client 350. In some embodiments, the operating system data 353 at the virtual media client 350 may include more than one instance of a particular operating system and/or more than one instance of an operating system may be run at the virtual media client 350 simultaneously and the onboard server 320 and/or a remote server may be configured to generate confidence scores for each instance of the operating system.

The virtual media client 350 may be configured to run different operating systems and/or instances/versions of one or more operating systems at different times during a trip of the mobile platform 305. For example, the virtual media client 350 may be configured to dynamically and/or periodically cycle through multiple operating systems and/or instances of an operating system during a trip. In some embodiments, the virtual media client 350 may be configured to run multiple operating systems and/or instances of one or more operating systems in response to relatively low confidence scores for the virtual media client. For example, in response to a confidence score of the virtual media client 350 over a period of one or more trips of the mobile platform 305 falling below a threshold value, the virtual media client 350 may be configured to dynamically cycle through multiple operating systems and/or instances of one or more operating systems to generate confidence scores of the virtual media client 350 for the multiple instances and/or multiple operating systems. The generated confidence scores may be compared to determine a highest confidence score, which may correlate to an operating system and/or an instance of an operating system that may most likely be used by PEDs 316 and/or entertainment systems 318 onboard the mobile platform 305. In this way, quality of experience scores may be calibrated based on one or more characteristics (e.g., device type and/or operating system) of the user media clients onboard the mobile platform 305.

In some embodiments, the virtual media client 350 may be configured to generate performance data 301 associated with each operating system and/or instance of operating system that the virtual media client 350 is configured to run. For example, the virtual media client 350 may be configured to generate a first set of performance data 301 associated with a first operating system and to generate a second set of performance data 301 associated with a second operating system and/or to transmit the first and second sets of performance data 301 to the onboard server 320.

The virtual media client 350 may be configured to run different operating systems and/or instances of operating systems simultaneously, sequentially, and/or alternatively. For example, the virtual media client 350 may be configured to run a first operating system and switch to a second operating system.

In some embodiments, the virtual media client 350 may be configured to generate performance data 301 for different operating systems and/or software applications simultaneously and/or on a case-by-case basis. The virtual media client 350 may be configured to mimic any of a variety of device characteristics. For example, Android devices might have a unique way of playing media content and the virtual media client 350 may be configured to monitor quality of experience data similarly to an Android device.

Some user media clients may operate using a closed ecosystem which may prevent the onboard server 320 from collecting performance data 301 from such user media clients. However, the virtual media client 350 may be configured to emulate closed ecosystem devices (e.g., iOS devices) and advantageously provide performance data 301 using operating systems and/or software applications inherent to such closed ecosystem devices.

Performance data 301 gathered from the virtual media client 350 may be useful in providing meaningful reports related to performance of a communication service (including performance of linear media channels) provided on the mobile platform 305. Moreover, the virtual media client 350 may be useful in troubleshooting various issues related to a communication service at the mobile platform 305. For example, if the virtual media client 350 provides performance data 301 indicating good performance while a PED 316 provides performance data 301 indicating poor performance, the performance data 301 of the virtual media client 350 may be compared to the performance data 301 of the PED 316 to determine a difference in performance results. Moreover, the user of the PED 316 can be notified that there may be an issue with the PED 316 in response to a detected difference in results.

In some embodiments, the virtual media client 350 may be configured to play and/or monitor certain linear media channels 304 and/or all linear media channels 304 provided to the mobile platform 305. Different methods of selecting certain linear media channels 304 for the virtual media client to receive and/or provide performance data 301 in response to receiving. In some embodiments, the virtual media client 350 may be configured to monitor linear media channels 304 based on popularity of the linear media channels 304. For example, the virtual media client 350 may be configured to monitor the most requested and/or streamed linear media channel(s) for the mobile platform 305.

In some embodiments, user media clients may be configured to transmit media requests specifying one or more linear media channels. Similarly, in some embodiments, the virtual media client 350 may be configured to transmit media requests specifying one or more linear media channels. In some cases, the virtual media client 350 may not be required to transmit media requests. For example, it may be beneficial for the virtual media client 350 to receive a most popular linear media channel and/or at least one linear media channel currently accessed on the mobile platform 305 by a user media client. Thus, because such linear media channels may already be available to the onboard server 320, the virtual media client 305 may be able to receive such linear media channels without transmitting media requests.

In some embodiments, the virtual media client 350 may be configured to monitor multiple linear media channels simultaneously or sequentially. In this way, performance data 301 from the virtual media client 350 may be useful in detecting performance issues with a particular linear media channel. For example, if performance data 301 from the virtual media client 350 related to a first linear media channel indicates good performance but performance data 301 from the virtual media client 350 related to a second linear media channel indicates poor performance, it may be determined that an issue exists related to the second linear media channel. In some cases, the virtual media client 350 may be configured to monitor only linear media channels already requested by PEDs 316 and/or seatback systems 318 such that the virtual media client 350 may not increase content demands of the mobile platform 305.

In some embodiments, the virtual media client 350 may be separate from the onboard server 320, as shown in FIG. 3. Moreover, the virtual media client 350 may be configured to receive linear media channels 304 from a WAP 365 rather than directly from the onboard server 320. For example, the virtual media client 350 may be configured to connect to the WAP 365 via a Wi-Fi dongle and/or similar circuitry to communicate with the WAP 365. In this way, performance data 301 from the virtual media client 350 indicating poor performance may be used to identify performance issues related to the WAP 365.

The virtual media client 350 may be configured to be situated onboard the mobile platform 305. In this way, the virtual media client 350 may be configured to accurately represent quality of experience performance for devices onboard the mobile platform 305. While the virtual media client 350 is shown as being separate from the onboard server 320, the virtual media client 350 may be incorporated into the onboard server 320. Moreover, the virtual media client 350 may be configured to receive linear media channels 304 directly from the onboard server 320 (e.g., without receiving the linear media channels 304 via a WAP 365).

Collection of performance data 301 from virtual media clients 350 may advantageously allow for collection of performance data 301 without requiring direct access to and/or collection of performance data 301 from user media clients (e.g., PEDs 316). For example, some PEDs 316 may comprise hardware and/or software which may prevent collection of performance data 301 and/or other related data. Moreover, in some cases, a certain PED may comprise hardware and/or software that may be unfamiliar and/or otherwise provide data that may be difficult or impossible to utilize for evaluation of performance of the communication systems at the mobile platform 105. Furthermore, in some cases, a user may prefer that data not be collected from the user's PED 316. Accordingly, a virtual media client 350 may advantageously allow for collection of performance data 301 at the mobile platform 305 without requiring collection from user media clients.

Moreover, virtual media clients 350 may be configured to provide performance data 301 that may be representative of performance of user media clients onboard the mobile platform 305. In some cases, performance issues may be caused by transmission failures between a satellite and the onboard server 320. Accordingly, even if transmission of data between a remote (e.g., on-ground) server and the satellite is good, performance issues related to various linear media channels 304 received at the mobile platform 305 from the satellite over the network 322 may occur due to various factors (e.g., weather) during transmission from the satellite to the mobile platform 305. Because the virtual media client 350 can be situated onboard the mobile platform 305, any performance issues arising during transmission of data between a satellite and the onboard server 320 may be experienced by the virtual media client 350 as well as the user media clients onboard the mobile platform 305.

In some embodiments, the onboard server 320 may be configured to receive performance data 301 not only from the virtual media client 350, but from various PEDs 316 and/or seatback systems 318 onboard the mobile platform 305 as well. In this way, performance data 301 related to PEDs 316, for example, can be compared to performance data 301 of the virtual media client 350 to detect PEDs 316 experiencing performance issues. For example, if a PED 316 provides performance data 301 indicating very different performance data 301 from the virtual media client 350, performance data 301 from the PED 316 may be excluded and/or discarded from performance evaluation determinations.

Statistical thresholds may be utilized to determine performance issues related to the PEDs 316 and/or to the virtual media client 350. For example, if all PEDs 316 onboard a mobile platform 305 show poor performance of the communication service but the virtual media client 350 indicates good performance, it may be determined that an issue exists with respect to the virtual media client 350.

Quality of Experience Evaluation Processes

Figure 4:
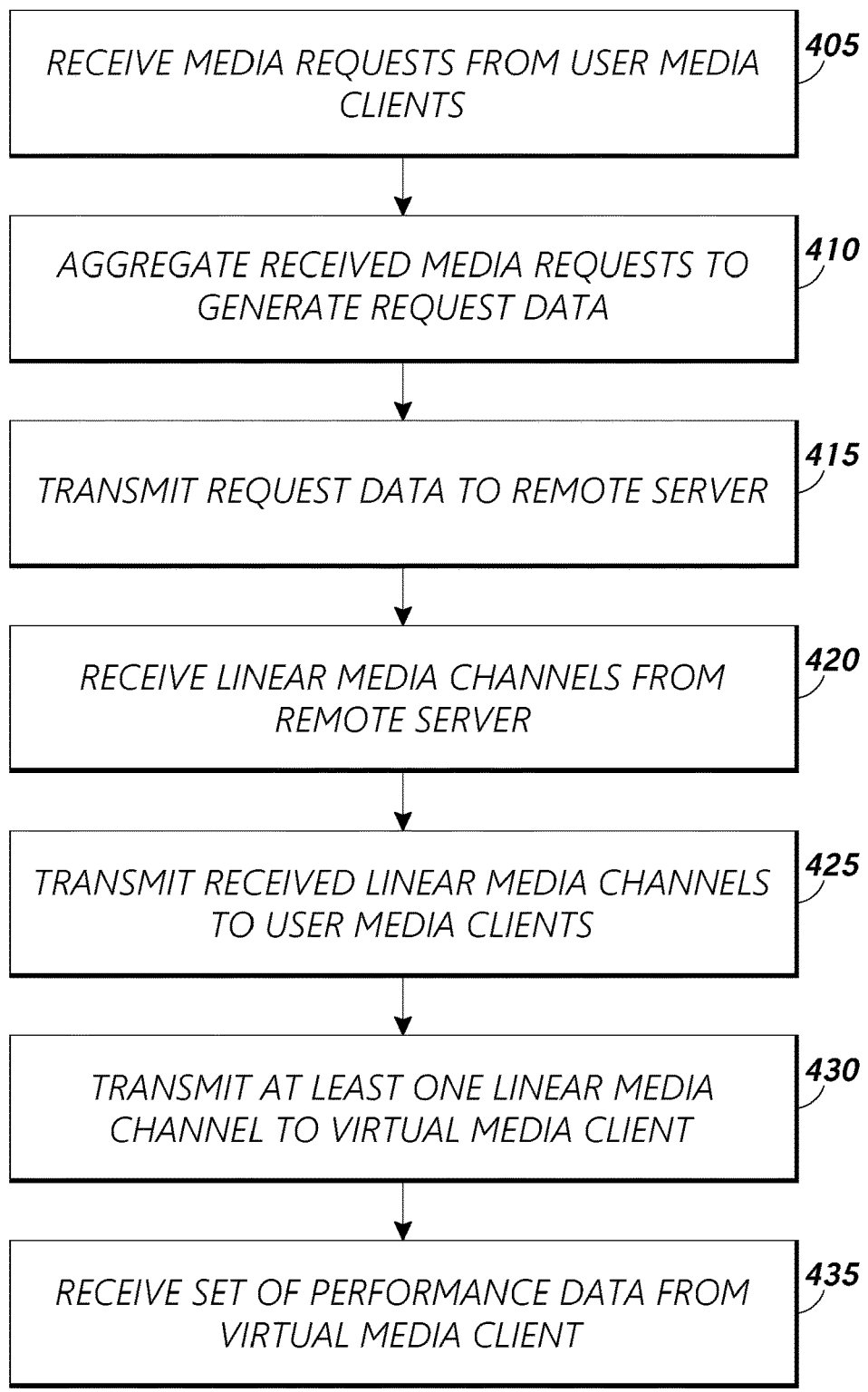
FIG. 4 illustrates a process for onboard and/or on-ground performance evaluation of a communication service provided onboard a mobile platform in accordance with embodiments the present disclosure.

FIG. 4 illustrates a process 400 for onboard performance evaluation of a communication service provided onboard a mobile platform in accordance with embodiments the present disclosure. While steps of the process 400 are described as being performed by an onboard server, such steps may instead be performed by a remote server.

The process 400 involves, at block 405, receiving one or more media requests from user media clients situated onboard a mobile platform. The media requests may be received from a plurality of user media clients. In some embodiments, media requests may be received continuously and/or periodically. Each of the media requests may indicate and/or specify of one or more linear media channels. The one or more linear media channels may include channels not presently accessed at the mobile platform and/or linear media channels that are presently accessed (e.g., played at one or more user media clients onboard the mobile platform). The user media clients may transmit media requests periodically and/or in response to certain events (e.g., a user selecting a new channel at the user media client).

In some embodiments, a virtual media client onboard the mobile platform may also be configured to transmit media requests to the onboard server. The manner in which the virtual media client requests, receives, and/or accesses linear media channels can vary from embodiment to embodiment. In some embodiments, the virtual media client may be configured to transmit media requests for only linear media channels that are currently being consumed by one or more user media clients. For example, the virtual media client may be configured to receive all linear media channels that are currently being consumed and/or may be configured to monitor all of the linear media channels in parallel (e.g., via multi-threading). As another example, the virtual media client may be configured to receive and/or monitor less than all of linear media channels being consumed, such as by monitoring linear media channels one at a time by switching among the channels periodically and/or by selecting a representative channel for monitoring. In other embodiments, the virtual media client may be configured to receive and/or monitor channels that are not currently being consumed by user media clients onboard a mobile platform. For example, the virtual media client may be configured to temporarily request and/or monitor a channel of a channel offering line-up that may not be currently consumed by user media clients. In this way, the virtual media client may be configured to ensure proper performance of all linear media channels offered via a communication service.

At block 410, the process 400 involves aggregating the received media requests to generate request data specifying certain linear media channels. In some embodiments, aggregating may involve comparing the media requests to identify media requests indicating a common linear media channel. For example, different media requests from different user media clients may specify a common linear media channel. The onboard server may be configured to remove duplicate media requests to limit the amount of data transmitted to the remote server. Moreover, aggregation may involve other forms of data processing, including, for example, compression of the received media requests. At block 415, the process 400 involves transmitting the generated request data to the remote server.

At block 420, the process 400 involves receiving linear media channels from the remote server. The received linear media channels may include all or a subset of the linear media channels specified in the request data.

At block 425, the process 400 involves transmitting/providing the linear media channels to the plurality of user media clients onboard the mobile platform. The onboard server may be configured to provide all of the received linear media channels to all of the user media clients or may provide to a particular user media client only the linear media channels requested by the particular user media client.

At block 430, the process 400 involves transmitting/providing at least one of the received linear media channels to a virtual media client onboard the mobile platform. In some embodiments, the linear media channel provided to the virtual media client may be selected at least in part based on popularity or other feature of the linear media channel.

At block 435, the process 400 involves receiving a first set of performance data from the virtual media client. The first set of performance data may comprise a single performance data type (e.g., one of startup data and rebuffer data) or may comprise multiple performance data types (e.g., both startup data and rebuffer data). The performance data may be indicative of performance (e.g., streaming performance) of the linear media channel provided to the virtual media client.

In some embodiments, the onboard server may be configured to receive a second set of performance data from one or more user media clients. The second set of performance data may comprise a single performance data type (e.g., one of startup data and rebuffer data) or may comprise multiple performance data types (e.g., both startup data and rebuffer data). In some embodiments, the first set of performance data may comprise different performance data types than the second set of performance data or the first set of performance data may comprise identical performance data types to the second set of performance data.

In some embodiments, onboard servers and/or on-ground servers may receive performance data from the virtual media client and/or one or more user media clients. Received performance data may be correlated to and/or aggregated with other performance data at the onboard server and/or on-ground server to generate one or more quality of experience scores. In some embodiments, features of the virtual media client (e.g., operating systems and/or software) may be adapted and/or changed based on received performance data from the virtual media client and/or one or more user media clients.

General Comments

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

Reference throughout this disclosure to "some embodiments," "certain embodiments," or "an embodiment" means that a particular feature, structure or characteristic described in connection with the embodiment can be included in at least some embodiments. Thus, appearances of the phrases "in some embodiments," "in certain embodiment," or "in an embodiment" in various places throughout this specification are not necessarily all referring to the same embodiment, and may refer to one or more of the same or different embodiments. Furthermore, embodiments disclosed herein may or may not be embodiments of the invention. For example, embodiments disclosed herein may, in part or in whole, include non-inventive features and/or components. In addition, the particular features, structures or characteristics can be combined in any suitable manner, as would be apparent to one of ordinary skill in the art from this disclosure, in one or more embodiments.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A communication system comprising:
an onboard server situated onboard a mobile platform;
a remote server situated outside the mobile platform, the remote server configured to generate one or more live video channels for use by the onboard server; and
a virtual media client situated onboard the mobile platform;
wherein:
the virtual media client is configured to:
store a first operating system and a second operating system;
receive live video channels from the onboard server;
simultaneously stream at least a first live video of the live video channels using the first operating system and the second operating system; and
transmit performance data to the onboard server; and
the onboard server is configured to:
receive one or more media requests from a plurality of user media clients onboard the mobile platform, the one or more media requests specifying one or more live video channels;
receive the one or more live video channels from the remote server;
provide the one or more live video channels to the plurality of user media clients according to the received one or more media requests;
provide at least a first live video channel of the one or more live video channels to the virtual media client; and
receive a first set of performance data associated with the first live video channel from the virtual media client.

2. The communication system of claim 1, wherein the onboard server is further configured to transmit request data indicative of the one or more live video channels to the remote server, and the one or more live video channels received from the remote server are provided in response to the request data.

3. The communication system of claim 2, wherein the request data comprises an aggregation of the one or more media requests.

4. The communication system of claim 1, wherein:
the virtual media client is further configured to transmit media requests to the onboard server; and
the onboard server is further configured to provide at least the first live video channel to the virtual media client in response to the media requests from the virtual media client.

5. The communication system of claim 4, wherein the onboard server is further configured to:
receive a first media request from the virtual media client, the first media request specifying a second live video channel that is not included in the one or more live video channels;
receive the second live video channel from the remote server;
provide the second live video channel to the virtual media client; and
receive a second set of performance data associated with the second live video channel from the virtual media client.

6. The communication system of claim 1, wherein the first set of performance data relates to streaming of the first live video channel at the virtual media client.

7. The communication system of claim 1, further comprising a scoring subsystem configured to obtain the first set of performance data from the onboard server and to calculate a quality of experience score associated with the first live video channel based at least in part on the first set of performance data.

8. The communication system of claim 1, wherein the onboard server is further configured to receive a second set of performance data from a first user media client of the plurality of user media clients.

9. The communication system of claim 8, further comprising a scoring subsystem, wherein the onboard server is configured to provide the first and second sets of performance data to the scoring subsystem.

10. The communication system of claim 9, wherein the scoring subsystem is configured to generate a quality of experience score based at least in part on the first and second sets of performance data.

11. The communication system of claim 10, wherein generating the quality of experience score involves comparing the first set of performance data to the second set of performance data.

12. The communication system of claim 11, wherein the scoring subsystem is further configured to compare the first set of performance data to the second set of performance data to generate a confidence score for the virtual media client.

13. The communication system of claim 12, wherein the scoring subsystem is further configured to perform a training operation based at least in part on the confidence score.

14. The communication system of claim 1, wherein the first set of performance data includes performance data associated with the first operating system, and wherein the onboard server is further configured to receive a second set of performance data associated with the second operating system from the virtual media client.

15. The communication system of claim 1, wherein the virtual media client is configured to cycle between the first operating system and the second operating system.

16. The communication system of claim 1, wherein the virtual media client is further configured to:

store emulation data for emulating one or more network browsers; and stream the first live video channel using the emulation data.

17. The communication system of claim 1, wherein at least one of the plurality of user media clients is a personal electronic device.

18. The communication system of claim 1, wherein the one or more live video channels comprise television content.

19. The communication system of claim 1, wherein the first set of performance data comprises one or more of startup data and rebuffer data.

20. The communication system of claim 1, wherein the onboard server is further configured to selectively provide the first live video channel to the virtual media client and automatically stream the first live video channel at the virtual media client based at least in part on popularity of the first live video channel.

21. A method comprising:
receiving, at an onboard server situated onboard a mobile platform, one or more media requests from a plurality of user media clients onboard the mobile platform, the one or more media requests specifying one or more real-time broadcast channels;
receiving, at the onboard server, the one or more real-time broadcast channels from a remote server situated outside the mobile platform, the remote server configured to generate one or more real-time broadcast channels for use by the onboard server;
providing the one or more real-time broadcast channels from the onboard server to the plurality of user media clients according to the received one or more media requests;
providing at least a first real-time broadcast channel of the one or more real-time broadcast channels from the onboard server to a virtual media client onboard the mobile platform, wherein the virtual media client is configured to store a first operating system and a second operating system;
simultaneously streaming, at the virtual media client, the first real-time broadcast channel using the first operating system and the second operating system; and
receiving, at the onboard server, a first set of performance data associated with the first real-time broadcast channel from the virtual media client.

22. The method of claim 21, further comprising transmitting request data indicative of the one or more real-time broadcast channels to the remote server, and the one or more real-time broadcast channels received from the remote server are provided in response to the request data.

23. The method of claim 22, wherein the request data comprises an aggregation of the one or more media requests.

24. The method of claim 21, further comprising:
transmitting media requests from the virtual media client to the onboard server; and
automatically streaming the first real-time broadcast channel from the onboard server to the virtual media client in response to the media requests from the virtual media client.

25. The method of claim 24, further comprising:
receiving, at the onboard server, a first media request from the virtual media client, the first media request specifying a second real-time broadcast channel that is not included in the one or more real-time broadcast channels;
receiving, at the onboard server, the second real-time broadcast channel from the remote server;
providing the second real-time broadcast channel from the onboard server to the virtual media client; and
receiving, at the onboard server, a second set of performance data associated with the second real-time broadcast channel from the virtual media client.

26. The method of claim 21, wherein the first set of performance data relates to streaming of the first real-time broadcast channel at the virtual media client.

27. The method of claim 21, further comprising:
obtaining, at a scoring subsystem, the first set of performance data from the onboard server; and
calculating, at the scoring subsystem, a quality of experience score associated with the first real-time broadcast channel based at least in part on the first set of performance data.

28. The method of claim 21, further comprising: receiving, at the onboard server, a second set of performance data from a first user media client of the plurality of user media clients.

29. The method of claim 28, further comprising providing the first and second sets of performance data from the onboard server to a scoring subsystem.

30. The method of claim 29, further comprising generating, at the scoring subsystem, a quality of experience score based at least in part on the first and second sets of performance data.

31. The method of claim 30, wherein generating the quality of experience score involves comparing the first set of performance data to the second set of performance data.

32. The method of claim 31, further comprising comparing, at the scoring subsystem, the first set of performance data to the second set of performance data to generate a confidence score for the virtual media client.

33. The method of claim 32, further comprising performing, at the scoring subsystem, a training operation based at least in part on the confidence score.

34. The method of claim 21, wherein the first set of performance data includes performance data associated with the first operating system, and the method further comprises receiving, at the onboard server, a second set of performance data associated with the second operating system from the virtual media client.

35. The method of claim 21, further comprising cycling, at the virtual media client, between the first operating system and the second operating system.

36. The method of claim 21, further comprising: storing, at the virtual media client, emulation data for emulating one or more network browsers; and streaming, at the virtual media client, the first real-time broadcast channel using the emulation data.

37. The method of claim 21, wherein at least one of the plurality of user media clients is a personal electronic device.

38. The method of claim 21, wherein the one or more real-time broadcast channels comprise television content.

39. The method of claim 21, wherein the first set of performance data comprises one or more of startup data and rebuffer data.

* * * * *